(12) United States Patent
Knittel

(10) Patent No.: US 6,982,828 B2
(45) Date of Patent: Jan. 3, 2006

(54) MICROSCOPE SLIDE HAVING A MARKING REGION

(75) Inventor: Waldemar Knittel, Braunschweig (DE)

(73) Assignee: Waldemark Knittel Glasbearbeitungs GmbH, Braunschweig (DE)

( * ) Notice: Subject to any disclaimer, the term of this patent is extended or adjusted under 35 U.S.C. 154(b) by 0 days.

(21) Appl. No.: 10/851,656

(22) Filed: May 24, 2004

(65) Prior Publication Data

US 2004/0263962 A1 Dec. 30, 2004

(30) Foreign Application Priority Data

May 22, 2003 (DE) .................................. 103 23 711

(51) Int. Cl.
 *G02B 21/34* (2006.01)
(52) U.S. Cl. ....................................... 359/396; 356/244
(58) Field of Classification Search ................ 359/396, 359/397, 398; 356/244; 428/210
 See application file for complete search history.

(56) References Cited

U.S. PATENT DOCUMENTS

| | | | |
|---|---|---|---|
| 5,111,344 A | * | 5/1992 | Robinson, Jr. .............. 359/391 |
| 5,154,448 A | | 10/1992 | Griffin et al. |
| 5,598,295 A | | 1/1997 | Olofson |
| 5,866,241 A | * | 2/1999 | Xiang ........................ 428/210 |
| 2002/0122925 A1 | | 9/2002 | Liu et al. |

FOREIGN PATENT DOCUMENTS

DE        198 12 072 A1     9/1999

\* cited by examiner

*Primary Examiner*—Mark A. Robinson
(74) *Attorney, Agent, or Firm*—Whitham, Curtis & Christofferson, PC

(57) ABSTRACT

The invention relates to a microscope slide formed from a transparent glass plate on which a first coating (3) and a second coating (4) contrasting therewith are located aligned one above another in a marking region (1b), the second coating (4) being designed for providing a marking (6) by removing the material of the second coating (4). In order to improve the microscope slide, it is proposed that the two coatings are located on one side (2) of the glass plate (1), the second coating (4) lying over the first coating (3), and wherein at least the surface of the first coating (3) is designed by comparison with the provision of the marking (6) on the second coating (4).

10 Claims, 1 Drawing Sheet

MICROSCOPE SLIDE HAVING A MARKING REGION

Figure 2:
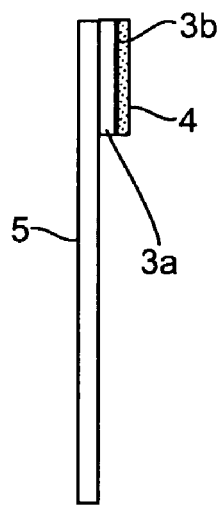

The invention relates to a microscope slide formed from a transparent glass plate on which a first coating and a second coating contrasting therewith are located aligned one above another in a marking region, the second coating being designed for providing a marking by removing the material of the second coating.

U.S. Pat. No. 5,598,295 discloses a glass plate that is designed as a microscope slide provided with a marking region. Provided at one end of the rectangular microscope slide is a marking region within which there is provided on a first side an opaque, scratchable and/or scribable coating, and within which there is applied to a second side of the microscope slide a second coating contrasting with the first coating. In this case, the coatings are aligned exactly one above another.

The coatings are colored such that markings produced in the first coating by scratching or scribing appear in the hue of the second coating when seen from the first side of the glass plate of the microscope slide. In this case, the first coating is preferably maintained in a brighter color, whereas the second coating has a darker coloration. The disadvantage of this microscope slide resides in the fact that producing the marking region requires the microscope slide to be treated on both sides.

It is therefore the object of the invention to simplify the production process of the microscope slide named at the beginning with regard to a surface treatment before the respective application of the coatings.

The object is achieved by virtue of the fact that in the case of a microscope slide of the type named at the beginning both coatings are located on one side of the glass plate, the second coating lying over the first coating, and at least the surface of the first coating being designed to be resistant to providing the marking on the second coating.

According to the invention, the two coatings serving to visualize a marking are provided on the same side of the microscope slide. In this case, a marking provided on the first coating by a removal operation such as, for example, scratching off is rendered visible by the second coating, which cannot be impaired by the operation of providing the marking. If the marking is performed, for example, with the aid of a brush or a pencil, said marking can be perceived via a contrast between what is scribed and the first coating.

The invention is attended by the advantage that with regard to possible damage the inventive microscope slide can be mounted and/or packed more simply. Moreover, the advantage results that the microscope slides, which are generally produced as a plurality of items from a large slab, can be effectively cut out of the wafer starting from the uncoated side of the latter, or that the finished microscope slides themselves can be effectively cut on the noncoated side.

The microscope slide can be designed such that the marking can be provided via a removal, preferably a scratching of the second coating, which can preferably be performed using a hard tool. The first and the second coating can also absorb electromagnetic radiation at mutually differing wavelengths. Selective removal of the second coating is thereby possible in conjunction with an appropriate energy density of an electromagnetic radiation absorbed only by the second coating.

The marking can preferably be provided via a removal of the second coating with the aid of a selective light beam, preferably a laser beam, that is selected for this coating. In this case, the first coating cannot absorb in the same wavelength region, and therefore also cannot be fused. The first coating is, for example, designed to be absorbing in a resonance range of high light energy. Again, the first coating can have a sufficiently high thermal conductivity such that irradiation with the aid of a laser beam for example does not result in a local heating leading to fusing or evaporation.

The microscope slide preferably contains glass made from a basic material, and a second coating containing a bakable epoxy dye. The first coating can preferably contain color pigments and have a roughened surface that can be scribed with the aid of a pencil to produce the marking, or that can be printed. At least the first coating is preferably opaque, it being further preferred also for the second coating to be opaque. As a result of this, a marking produced by removal of material is clearly emphasized. Furthermore, said marking is then discernible only from a side of the microscope slide that serves to accommodate a specimen, and therefore serves to identify the top side and underside of the microscope slide.

In a further embodiment, the first coating comprises a base layer covered with a cover layer, the cover layer being resistant to the removal operation of the material of the second coating, that is to say not being directly removed or being only slightly removed. In this case, the cover layer can be designed to be colorless and/or transparent, that is to say, for example, in the form of a hard clearcoat material protecting the base layer. The base layer then serves merely to produce an optical contrast for visualizing a marking applied by removing the second coating, and need not itself be hard. The first and the second coating are preferably chemically resistant.

The first coating comprises a granular material in order not be scratched and/or insipidly fused. Particular preference is given to the granular material of glass flour. The first coating can contain further organic color components and an adhesion promoter for producing good adhesion on the microscope slide. The first coating can contain a screen printing ink, for example it can be reddish given a second coating resulting in a white hue.

According to the invention, the first coating can be cured, for example, by ultraviolet light and/or by heat treatment at least at a boundary surface with the second coating, in order to ensure the resistivity against removal of the material of the second coating. The first coating can, however, also be designed to be hard throughout owing to self-curing.

Figure 1:
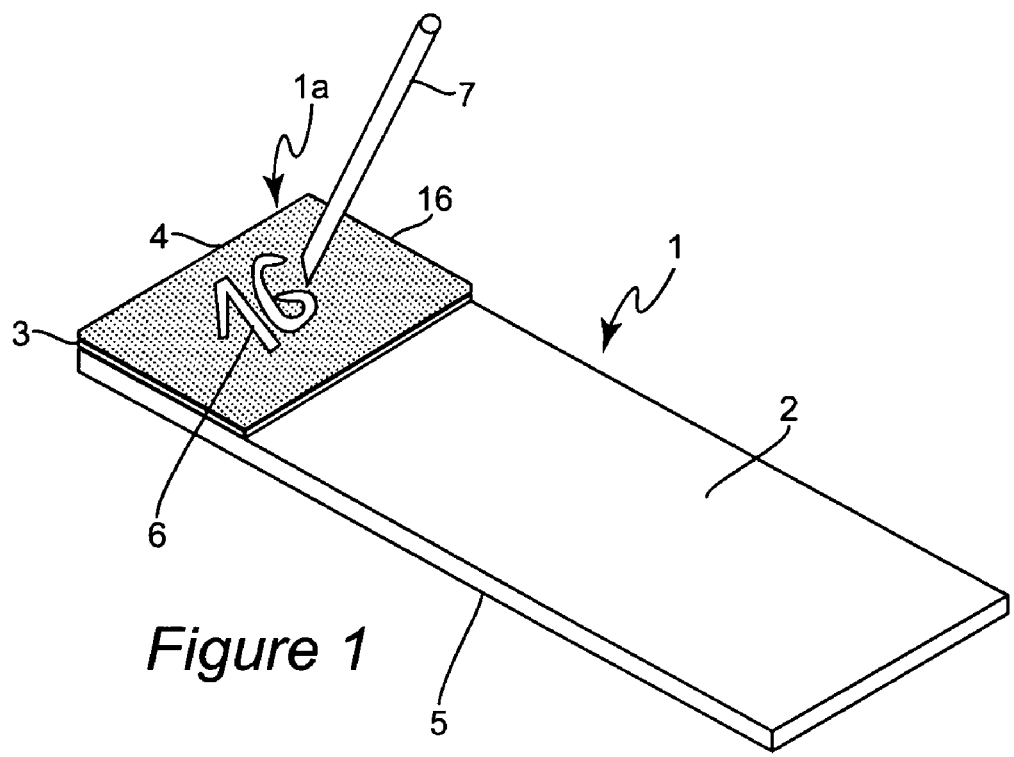

The invention is explained in more detail below with the aid of exemplary embodiments in conjunction with the accompanying drawings which are to different scales, and in which:

FIG. 1 shows a perspective view of a first embodiment of the microscope slide according to the invention, and FIG. 2 shows a side view along a long side of a second embodiment of the microscope slide according to the invention.

An inventive microscope slide 1 for microscopy or analysis has a marking region 1b at one end 1a. In the marking region 1b, a second coating 4 is provided, lying over a first coating 3, on a first side 2, serving to accommodate a specimen to be investigated microscopically, of the rectangular microscope slide 1. The second coating 4, which is exposed on one side, is designed as a multicomponent epoxy resin dye.

Seen from a second side 5, lying parallel to the first side 2, of the microscope slide 1, the second opaque coating 4 is covered by the first coating 3, which is likewise opaque. The first coating 3 is designed to contrast in color with the second coating 4. The first coating 3 contains glass flour and an adhesion promoter that is selective for glass. The first coating 3, which is applied using a color printing method, is cured with the aid of ultraviolet (UV) light, the glass flour pearlescing and solidifying. During the vertical crosslinking that takes place in this case, color pigments penetrate between the glass flour to give the first coating a specific homogeneous coloring.

The second coating 4, which is applied to the first coating 3, is baked in a baking oven after being applied by means of a color printing process.

The microscope slide 1, which is designed in particular for an optical microscope, is provided, as illustrated in FIG. 1, with a marking 6 in the marking region 1b by using a hard pencil 7 to scratch away the second coating 4 from the first coating 3, the first coating 3 not being removed, however.

In the embodiment according to the FIG. 2, the first coating 3 is subdivided into a base layer 3a and a cover layer 3b. The cover layer 3b is harder in this case than the base layer and harder than the second coating 4, such that it is not removed when a marking is produced by scratching with the aid of the hard pencil.

What is claimed is:

1. A microscope slide formed from a transparent glass plate (1) on which a first coating (3) and a second coating (4) contrasting therewith are located aligned one above another in a marking region (1b), the second coating (4) being designed for providing a marking (6) by removing the material of the second coating (4), wherein the two coatings are located on one side (2) of the glass plate (1), the second coating (4) lying on the first coating (3), and wherein at least the surface of the first coating (3) is designed to be resistant to the marking operation (6) on the second coating (4).

2. The microscope slide as claimed in claim 1, wherein the first coating (3) comprises a base layer (3a) covered with a cover layer (3b), and wherein the cover layer (3b) is resistant to the provision of the marking (6).

3. The microscope slide as claimed in claim 1, wherein the second coating can be removed, in particular can be scratched off, in order to provide the marking.

4. The microscope slide as claimed in claim 1, wherein the first and the second coating absorb electromagnetic radiation at mutually differing wavelengths.

5. The microscope slide as claimed in claim 1, wherein the first coating is cured by ultraviolet light.

6. The microscope slide as claimed in claim 1, wherein the first coating is self-curing or thermally cured.

7. The microscope slide as claimed in claim 1, wherein the first coating includes a granular material.

8. The microscope slide as claimed in claim 1, wherein the second coating comprises a bakable epoxy resin dye.

9. The microscope slide as claimed in claim 1, wherein the second coating has a roughened surface.

10. The microscope slide as claimed in claim 1, wherein the first and the second coating are opaque.

* * * * *